(12) United States Patent
Bouttefroy et al.

(10) Patent No.: US 10,991,155 B2
(45) Date of Patent: Apr. 27, 2021

(54) LANDMARK LOCATION RECONSTRUCTION IN AUTONOMOUS MACHINE APPLICATIONS

(71) Applicant: NVIDIA Corporation, San Jose, CA (US)

(72) Inventors: Philippe Bouttefroy, Redmond, WA (US); David Nister, Bellevue, WA (US); Ibrahim Eden, Redmond, WA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 16/385,921

(22) Filed: Apr. 16, 2019

(65) Prior Publication Data

US 2020/0334900 A1    Oct. 22, 2020

(51) Int. Cl.
*G06T 17/05* (2011.01)
*G06K 9/00* (2006.01)

(52) U.S. Cl.
CPC .......... *G06T 17/05* (2013.01); *G06K 9/00791* (2013.01)

(58) Field of Classification Search
CPC .............................. G06T 17/05; G06K 9/00791
See application file for complete search history.

(56) References Cited

U.S. PATENT DOCUMENTS

| | | | | |
|---|---|---|---|---|
| 9,623,905 B2* | 4/2017 | Shashua | ............. | G01C 21/3623 |
| 2009/0097704 A1* | 4/2009 | Savidge | ............... | H04N 5/3532 |
| | | | | 382/103 |
| 2011/0044557 A1* | 2/2011 | Abraham | ............. | H04N 13/239 |
| | | | | 382/275 |
| 2013/0100286 A1* | 4/2013 | Lao | ........................... | G08G 1/04 |
| | | | | 348/148 |
| 2015/0172626 A1* | 6/2015 | Martini | ..................... | G06K 9/46 |
| | | | | 348/50 |
| 2015/0304634 A1* | 10/2015 | Karvounis | ........... | G06K 9/6248 |
| | | | | 348/46 |
| 2017/0124758 A1* | 5/2017 | Jia | ........................... | G06F 30/20 |
| 2017/0357862 A1* | 12/2017 | Tatsubori | ................. | G08G 1/04 |
| 2019/0080467 A1* | 3/2019 | Hirzer | ....................... | G06T 7/74 |
| 2019/0146500 A1* | 5/2019 | Yalla | .................. | G01C 21/3602 |
| | | | | 701/25 |

OTHER PUBLICATIONS

R.I. Hartley, A. Zisserman—Multiple View Geometry in Computer Vision, Cambridge University Press, 2004.
K. Kutulakos, S. Seitz—A Theory of Shape by Space Carving, International Journal of Computer Vision 38(3), 199-218, 2000.

(Continued)

*Primary Examiner* — Michael Le
(74) *Attorney, Agent, or Firm* — Shook, Hardy & Bacon L.L.P.

(57) ABSTRACT

In various examples, locations of directional landmarks, such as vertical landmarks, may be identified using 3D reconstruction. A set of observations of directional landmarks (e.g., images captured from a moving vehicle) may be reduced to 1D lookups by rectifying the observations to align directional landmarks along a particular direction of the observations. Object detection may be applied, and corresponding 1D lookups may be generated to represent the presence of a detected vertical landmark in an image.

20 Claims, 12 Drawing Sheets

(56) References Cited

OTHER PUBLICATIONS

A. Laurentini—How far 3D shapes can be understood from 2D silhouettes, IEEE Transactions on Pattern Analysis and Machine Intelligence, 17(2), 188-195, 1995.
I. Mikić, M. Trivedi, E. Hunter, P. Cosman—Human Body Model Acquisition and Tracking Using Voxel Data, International Journal of Computer Vision, 53(2), 199-223, 2003.
K. Fukunaga, L. D. Hostetler—The Estimation of the Gradient of a Density Function, with Applications in Pattern Recognition, IEEE Transactions on Information Theory, 21 (1), 32-40, 1975.

* cited by examiner

LANDMARK LOCATION RECONSTRUCTION IN AUTONOMOUS MACHINE APPLICATIONS

BACKGROUND

Embodiments of the present disclosure relate to reconstruction of three-dimensional (3D) objects, and specifically to the reconstruction of 3D directional, linear, and/or vertical objects. 3D reconstruction has applications in various fields—such as computer vision and computer graphics—and generally seeks to capture the shape and appearance of real-world objects.

Conventional techniques for 3D reconstruction suffer from various drawbacks. For example, direct triangulation seeks to reconstruct a feature (e.g., a 3D feature) from a set of two-dimensional (2D) observations and associated camera pose (e.g., orientation and position). However, direct triangulation has a number of shortcomings. For example, direct triangulation requires data association across the 2D observations (e.g., a track of 2D observations for a given 3D point), but data association is often difficult to achieve in the presence of rapid and large motion. In some cases, the feature being reconstructed may not appear in some of the 2D observations. Further, direct triangulation may be sensitive to noisy observations and camera orientation, may not be easily parallelizable, and it may be difficult to guarantee an upper bound on the computation in the presence of noisy observations.

Another conventional technique for performing 3D reconstruction is volumetric reconstruction, which samples a 3D space and looks for indicia of a 3D object in a set of 2D observations. However, volumetric reconstruction requires solving a large number of independent problems: namely, computation of the joint probability at each point sampled in 3D space. Due to the computational complexity, conventional approaches to volumetric reconstruction generally cannot be performed in sufficient time for real-time applications.

SUMMARY

In the context of autonomous driving, 3D landmarks may be used for localization (e.g., positioning the vehicle in a map), and vertical landmarks may provide important longitudinal accuracy. Embodiments of the present disclosure relate to techniques for identifying locations of directional landmarks using 3D reconstruction. More specifically, systems and methods are disclosed for identifying locations of directional landmarks, such as vertical landmarks. Vertical landmarks may include electrical poles, sign poles, straight trees, light poles, and/or the like. Image data and/or data from other indicia of directional landmarks may be used to determine their locations. In contrast to conventional systems, the system of the present disclosure may consolidate the indicia data into a reduced form that reflects the directional landmarks without requiring storage, retrieval, or analysis of all of the original indicia data. The consolidated indicia data may be used to reconstruct the locations of the directional landmarks in a 3D space. In contrast to conventional systems, a 3D reconstruction may be reduced to a 2D task, for example, by determining the location of a directional landmark on a 2D plane (e.g., the ground plane of a 3D space). The locations of detected landmarks may be embedded in a map, provided to a map provider for integration within a map, or otherwise. In embodiments that involve detection of vertical landmarks, the detected vertical landmarks may aid an autonomous vehicle in navigating a physical environment.

BRIEF DESCRIPTION OF THE DRAWINGS

The present systems and methods for landmark location reconstruction in autonomous machine applications is described in detail below with reference to the attached drawing figures, wherein.

DETAILED DESCRIPTION

Figure 1:
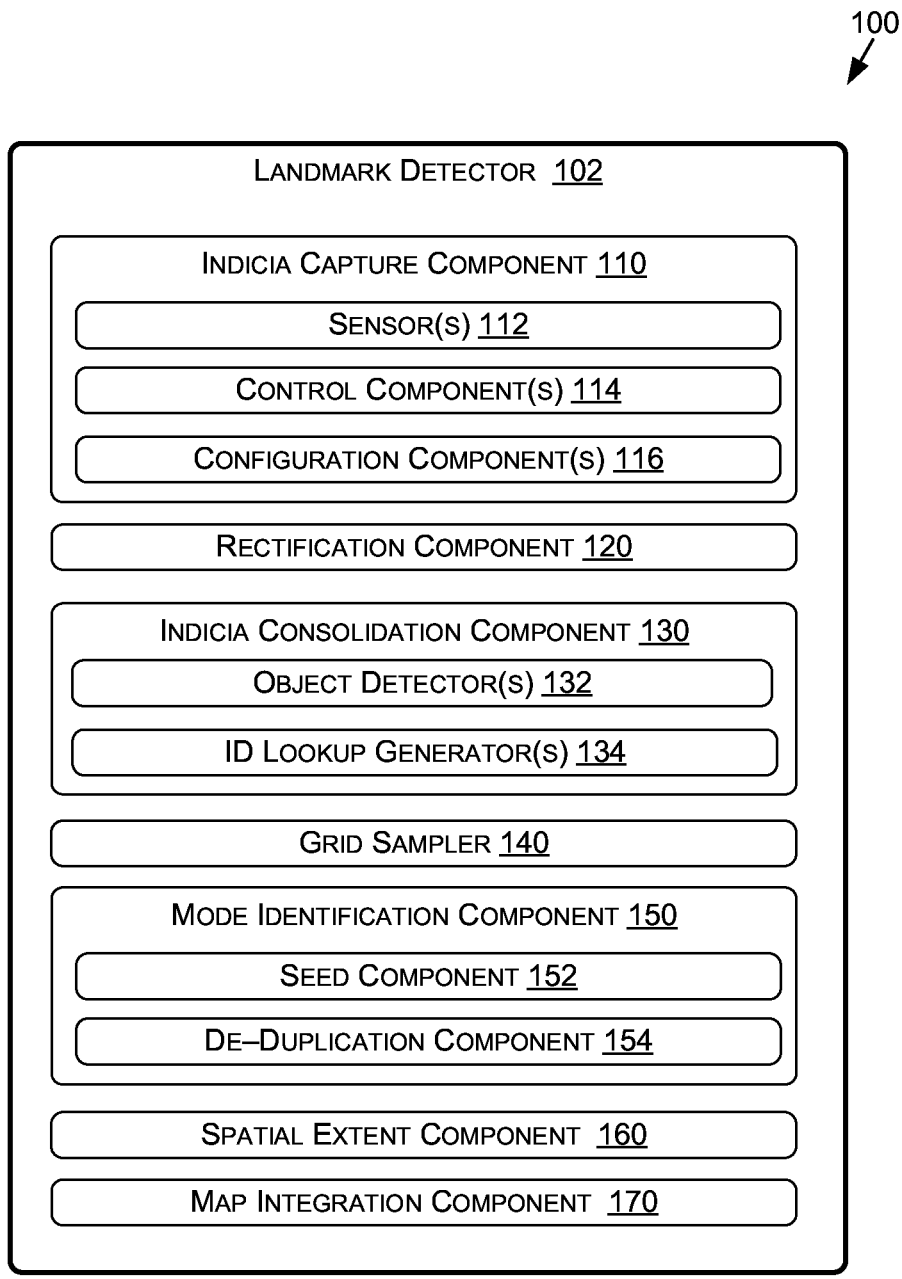
FIG. 1 is a block diagram of an example landmark detector, in accordance with some embodiments of the present disclosure.

Systems and methods are disclosed related to detection of three-dimensional (3D) directional landmarks, such as 3D vertical landmarks. The present disclosure may be described with respect to a vehicle that facilitates landmark detection. Examples of suitable vehicles are described in more detail below with respect to FIGS. 10 and 11. Further, although the present disclosure may be described with respect to a vehicle that facilitates landmark detection, this need not be the case. The methods and processes described herein may be implemented without a vehicle and/or in configurations that include additional or alternative structures, components, and/or architectures without departing from the scope of the present disclosure. For example, the present disclosure may be suitable in robotics applications, augmented reality (AR) applications, virtual reality (VR) applications, drone or unmanned aerial vehicle (UAV) applications, and/or other applications where identifying vertical landmarks may be helpful for localization, navigations, and/or other uses.

The present disclosure relates to techniques for identifying locations of directional landmarks using 3D reconstruction. More specifically, embodiments described herein involve methods and processes for indicia capture, rectification, indicia consolidation, 3D reconstruction, and/or mode identification. In some examples, indicia consolidation may reduce two-dimensional (2D) observations to corresponding 1D lookups to reduce processing and storage demands compared to conventional approaches that used 2D lookups. Additionally or alternatively, reconstruction of 3D directional landmarks such as vertical landmarks may be restricted to a 2D reconstruction, obviating the need to sample one of the dimensions of a 3D grid and reducing a number of corresponding computations required as compared to using a 3D grid.

As described herein, some conventional systems use direct triangulation to reconstruct a 3D feature from a set of two-dimensional (2D) observations and associated camera orientations. Direct triangulation may be used to estimate the 3D location of an observed 3D point using a direct linear transform and selecting the solution that minimizes algebraic and/or geometric error across the set of observations. However, direct triangulation has a number of shortcomings. For example, direct triangulation requires data association across the 2D observations (e.g., a track of 2D observations for a given 3D point), but data association is often difficult to achieve in the presence of rapid and large motion. Further, direct triangulation may be sensitive to noisy observations and camera orientation, may not be easily parallelizable, and it may be difficult to guarantee an upper bound on the computation in the presence of noisy observations In addition, some conventional systems perform 3D reconstruction using volumetric reconstruction, which samples a 3D space and looks for indicia of a 3D object in a set of 2D observations. This principle is used in various applications, such as space carving from photo consistency, shape from silhouette, and probabilistic reconstruction of moving objects via background subtraction. Generally, volumetric reconstruction builds a 3D probability distribution that reflects the presence of a 3D object at a particular 3D location as the joint probability of the presence of the object in the set of 2D observations. However, volumetric reconstruction requires solving a large number of independent problems, namely, computation of the joint probability at each point sampled in 3D space. The computational complexity to compute the 3D probability distribution is $n^d$, where n is the number of samples per dimension and d is the number of dimensions (here, d=3). In practice, if volumetric reconstruction is not heavily parallelized, it cannot be performed in sufficient time for real-time applications.

Embodiments of the present disclosure, in contrast to conventional systems, involve reconstruction of 3D vertical landmarks, or other 3D directional landmarks, from indicia lookups in a rectified one-dimensional (1D) space. At a high level, a set of 2D observations of one or more 3D objects may be generated. For example, one or more sensors—such as cameras, LiDAR, etc.—may be mounted to a moving vehicle and used to capture images of a field(s) of view of the sensor(s), including vertical landmarks, as the vehicle travels. In some cases, a 2D observation (e.g., two dimensions of observed values) may be a portion of a 3D observation (e.g., two of three dimensions of observed values). Camera configuration information may be associated with the 2D observations. Object detection (e.g., edge or line detection) may be applied to generate an indication of directional landmarks (e.g., a parametrization, such as a line, polyline, segmentation mask, etc.). In embodiments that detect vertical landmarks, each observation may be rectified by applying a transformation to each observation so the vertical direction vanishing point is pushed to infinity. Alternatively, the transformation can be applied to an indication of detected directional landmarks (e.g., line, polyline, segmentation mask, etc.) As such, for each frame of the sensor data, a transformation may be applied based at least in part on the camera configuration information to generate a rectified observation.

The rectified observation may include the vertical landmarks transformed or translated such that the vertical landmarks extend vertically with respect to the rectified observation (e.g., extend along column(s) of pixels of the rectified observation). For each rectified observation, a corresponding 1D lookup may be generated to represent the presence of a detected vertical landmark by a probability distribution that is a function of a single parameter (e.g., normalized horizontal position in an image). By reducing each 2D observation to a 1D lookup (e.g., by generating the rectified frames), subsequent computations may no longer need to consider the full 2D observation (e.g., each pixel, or more specifically each row of pixels, of an image). As a result, much less data may need to be loaded, cached, and/or buffered as compared to conventional approaches that used 2D lookups, thus resulting in substantial processing and memory savings.

In some embodiments, reconstruction of 3D directional landmarks—such as vertical landmarks—may be performed without computing a full 3D probability distribution. For example, an assumption may be made that a directional landmark may be represented by its cross-section with a 2D plane. For example, in embodiments that identify vertical landmarks, the 2D position of the vertical landmark on the ground plane may be taken as representative of the 3D position (e.g., because the vertical landmark extends along a known, vertical direction, so the vertical direction may be factored out). As such, a 3D reconstruction may be restricted to a 2D reconstruction. As a result, a 2D grid may be sampled in 3D space (e.g., along the ground place), and for each 3D point, the probability that a vertical landmark is at that point may be computed based on the 1D lookups. More specifically, for a given point on the grid, the position of the point may be back-projected into each 1D lookup to compute a probability—for each of a designated number of 1D lookups (e.g., the N most recent 1D lookups, the N most recent 1D lookups that satisfy some baseline criteria, etc.)—that a vertical landmark is located at the position of the point. The probability that a vertical landmark is located at the position of the point may be assigned the joint probability of the different probabilities—e.g., one for each 1D lookup—that a vertical landmark is located at that position. The result may be a 2D probability distribution reflecting the likelihood that a vertical landmark is located at each point on the 2D grid (e.g., along the ground plane). Reducing a 3D reconstruction to a 2D reconstruction obviates the need to sample one of the dimensions of a 3D grid, thereby reducing a number of corresponding computations required as compared to using a 3D grid—such as in conventional volumetric reconstruction.

From the 2D probability distribution, the location of the vertical landmarks may be resolved by finding the modes of the distribution. Any conventional technique may be used, such as clustering, mode finding, optimization, and/or the like. In some examples, an iterative mode-climbing algorithm—such as mean-shift—may be applied to identify the modes. Generally, in order to ensure that all modes are climbed, there may be at least one seed in each basin of attraction in the probability distribution. In some embodiments, an assumption may be made that modes are separated by a minimum distance, d, (and using a kernel with infinite support) to facilitate identification of an upper bound on the number of seeds used, while ensuring that there is at least one seed within d of every point. Further, in the case of vertical landmark reconstruction, if the distance travelled by the vehicle per 2D observation is less than d, seeding only along the line orthogonal to the vehicle's displacement (e.g., along the ground plane) should identify all modes. In practice, even if the distance is more than d, the probability distribution may be smooth and anisotropic (e.g., elongated in the direction of travel) enough that the seed may be likely to converge to the corresponding mode. As such, in some examples, seeds may be initialized at an interval, d, along a line orthogonal to displacement of the vehicle.

In some embodiments, for each new 2D observation (or set of observations), a corresponding probability distribution may be estimated in world coordinates, and seeds may be generated to climb to the modes. In some embodiments, mean-shift may further be applied to the modes from a previous 2D observation (or set of observations). Consequently, multiple seeds may converge to the same mode, such that duplicates may be pruned. A pruning scheme based on distance, for example, may serve to discard duplicates (e.g., within 1 meter). In some embodiments, extents for reconstructed directional landmarks along the direction of the landmark (e.g., vertical heights for vertical landmarks) may be recovered by reprojecting a reconstructed directional landmark into the frames of sensor data and identifying starting points and ending points of detected directional landmarks by comparison to the reprojected landmark. In some examples, a persistent set of modes may be maintained (e.g., across time). In such examples, if a detected mode is not already present in the persistent set, the mode may be added to the set, and a signal may be emitted to serve as a notification that a new vertical landmark was found at a particular location. The locations of vertical landmarks may be embedded in a map, provided to a map provider for integration within a map or mapping application, or otherwise. As such, the vertical landmarks may aid an autonomous vehicle in navigating a physical environment, and specifically may aid the autonomous vehicle in localization for more accurate and safe navigation.

Now referring to FIG. 1, FIG. 1 is a block diagram of an example landmark detector 102, in accordance with some embodiments of the present disclosure. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

At a high level, the landmark detector 102 may capture indicia of 3D directional landmarks ("directional landmarks")—such as 3D vertical landmarks ("vertical landmarks")—and may identify the locations of the directional landmarks from the indicia. Generally, the landmark detector 102, or a portion thereof, may be implemented as a stand-alone device, or may be incorporated with, mounted to (e.g., fixedly or removeably), or otherwise associated with some machine or device. For example, the landmark detector 102, or a portion thereof, may be mounted to, or otherwise incorporated with, a vehicle, such as the example vehicle described below with respect to FIG. 10 or one of the vehicles 1110A through 1110N of FIG. 11. In some examples, the components, features, and/or functionality of the landmark detector 102 may be implemented using any or all of the features, components, and/or functionality of computing device 1200 of FIG. 12, described in more detail herein, or may include additional or alternative components.

In the embodiment illustrated in FIG. 1, the landmark detector 100 includes an indicia capture component 110, a rectification component 120, an indicia consolidation component 130, a grid sampler 140, a mode identification component 150, a spatial extent component 160, and a map integration component 170. This configuration is illustrated for example purposes only, and other configurations with similar or different functionality may be implemented without departing from the scope of the present disclosure. For example, some of the components of the landmark detector 100 may reside on another vehicle or device, such as the server 1130 of FIG. 11, described in more detail herein. These components may communicate with each other via a network, such as the network 1120 of FIG. 11.

The indicia capture component 110 may include one or more sensor(s) 112. The sensor(s) 112 may include any type of sensor capable of capturing sensor data comprising observations of 3D objects such as vertical landmarks. In some embodiments, the sensor(s) 112 may include one or more sensors capable of capturing, deriving, or otherwise generating sensor data representative of a frame including a 2D observation. For example, the sensor(s) 112 may include one or more cameras capable of generating images (e.g., 2D images), such as any or all of the cameras described below with respect to FIG. 10. Additionally or alternatively, the one or more sensor(s) 112 may include any combination of global navigation satellite system (GNSS) sensor(s), RADAR sensor(s), ultrasonic sensor(s), LIDAR sensor(s), inertial measurement unit (IMU) sensor(s), microphone(s), stereo camera(s), wide-view camera(s), infrared camera(s), surround camera(s), long range and/or mid-range camera(s), and/or other sensor types. Sensor data from any of these sensors, whether individually or in combination, may be used to capture, derive, or otherwise generate frames of 2D observations of 3D objects, such as vertical landmarks, appearing in a corresponding field of view.

The indicia capture component 110 may include a control component 114 that operates in communication with the sensor(s) 112 to generate and store a plurality of frames of sensor data over time. The control component 114 may include circuitry and/or logic that controls the sensor(s) 112 to capture the sensor data and generate a series of frames of sensor data (e.g., images) that serve as 2D observations. For example, in embodiments in which the sensor(s) 112 include a camera mounted to a vehicle, as the vehicle travels, the control component 114 may control the camera to capture a series of images of a field(s) of view of the camera. The frames (e.g., images) represented by the sensor data may be generated at designated times, intervals, on demand, upon the occurrence of some detected event, some combination thereof, or otherwise.

The indicia capture component 110 may include a configuration component 116. The configuration component 116 may be configured to determine or otherwise access configuration data comprising location and/or orientation data reflecting the location and/or orientation (e.g., pose) of the sensor(s) 112 at a given point in time. The configuration data for sensor(s) 112 may be determined or otherwise accessed in association with generating a frame of sensor data (e.g., at the time the sensor data was captured, the frame was generated, etc.), and the configuration data may be associated with the frame.

For example, the configuration component 116 may include a location component configured to determine or otherwise access location data reflecting the location of the sensor(s) 112. In embodiments in which the sensor(s) 112 are mounted to a vehicle, the location of the vehicle may be determined and used as the location of the sensor(s) 112. Location data may be determined or otherwise accessed based on data generated from one or more sensors such as a an accelerometer(s), a magnetometer(s), a gyroscope(s), a magnetic compass(es), and/or other sensor types, and/or may be based on any type of locationing technique, such as global navigation satellite systems (GNSS), cellular, and/or another wireless positioning technology, or otherwise.

Additionally or alternatively, the configuration component 116 may include an orientation component configured to determine or otherwise access orientation data reflecting the orientation of the sensor(s) 112 at a given point in time. Orientation data may be determined or otherwise accessed based on data generated from one or more sensors such as an accelerometer(s), a magnetometer(s), a gyroscope(s), a magnetic compass(es), and/or other sensor types. Additionally or alternatively, orientation data may be predetermined, for example, based on a known orientation. For example, a sensor that is mounted to a vehicle may be configured with a particular, known orientation relative to the vehicle. Thus, the orientation of the vehicle may be determined, and the orientation of the sensor(s) 112 may be determined based on the orientation of the vehicle and the relative orientation of the sensor(s) 112 to the vehicle.

In some embodiments, configuration data may be reflected with respect to a world coordinate system. For example, orientation data may be reflected as an orientation matrix (e.g., a rotation matrix) or some other suitable representation. In some embodiments, configuration data (e.g., location data and/or orientation data) associated with a frame of sensor data (e.g., an image) may be used to compute a perspective projection matrix (e.g., a 4×3 camera projection matrix). A perspective projection matrix may be used to transform an arbitrary 3D point in world space into its position in a frame of reference (e.g., image space, a 2D plane, etc.) corresponding to a frame (e.g., an image) represented by sensor data associated with a sensor 112 with a known location and orientation. For example, in embodiments in which the sensor(s) 112 include a camera that generates an image, a 4×3 camera projection matrix may be used to transform a 3D point into its 2D position in image space (e.g., its 2D position in the image). Generally, the perspective projection matrix for sensor(s) 112 may be determined or otherwise accessed in association with generating a frame (e.g., at the time the sensor data was captured, the frame was generated, etc.), and the perspective projection matrix may be associated with the frame.

Figure 2:
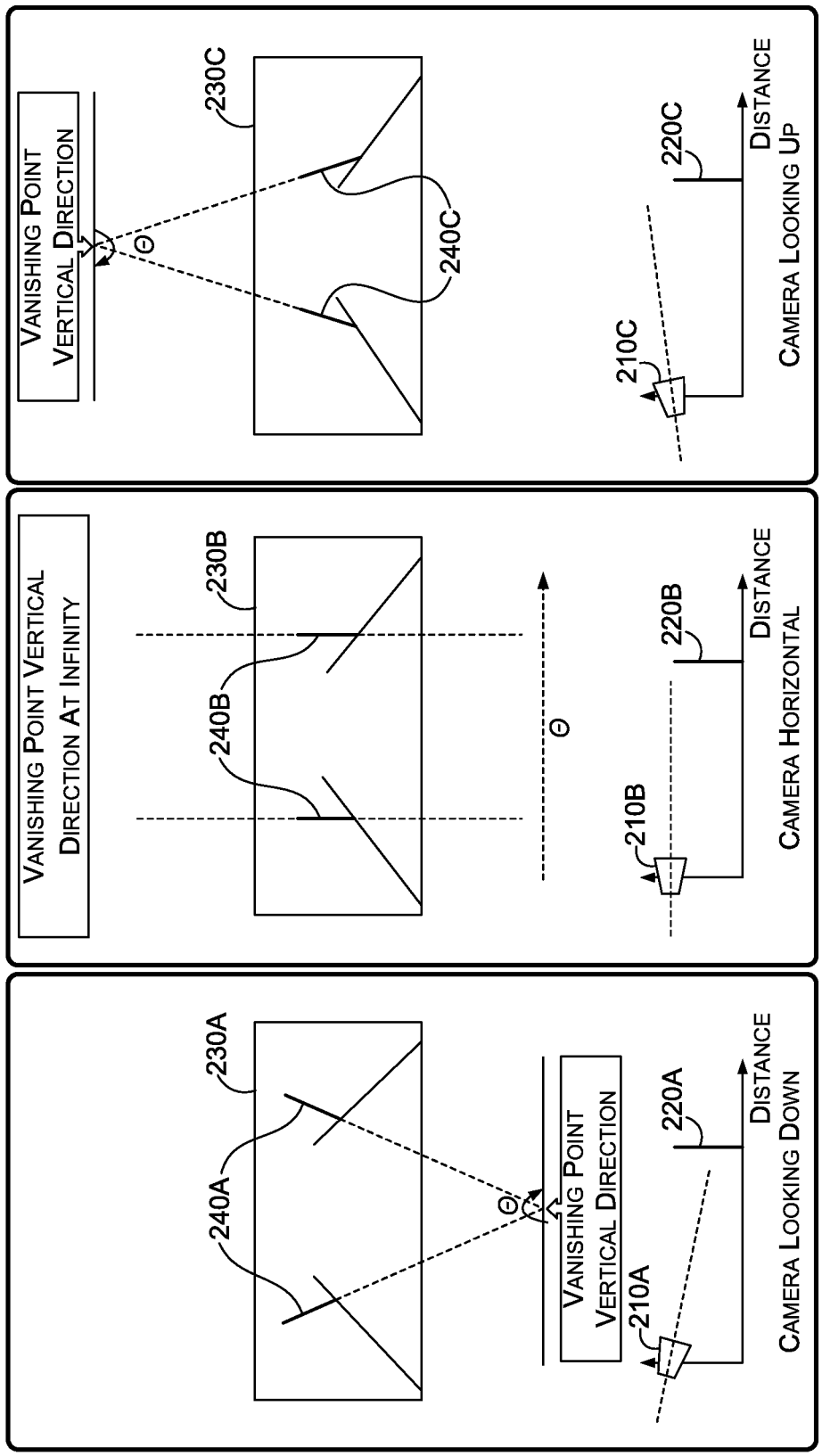
FIG. 2A is an illustration of an example of a sensor configuration and a corresponding two-dimensional observation, in accordance with some embodiments of the present disclosure.
FIG. 2B is an illustration of an example of another sensor configuration and a corresponding two-dimensional observation, in accordance with some embodiments of the present disclosure.
FIG. 2C is an illustration of an example of yet another sensor configuration and a corresponding two-dimensional observation, in accordance with some embodiments of the present disclosure.

In some embodiments, the rectification component 120 may apply a transformation to rectify one or more frames represented by the sensor data (e.g., each frame) to adjust an alignment of objects reflected in the frame(s). For example, to facilitate detection of directional landmarks (e.g., vertical landmarks) represented in a frame, the frame may be transformed to align the directional landmarks along a particular direction. Generally, taking images of vertical landmarks as an example, vertical landmarks may include electrical poles, sign poles, straight trees, light poles, and/or the like. If a camera that generates an image of a vertical landmark is pointed downwards or upwards, the vertical landmarks may not appear to be vertical in the image. FIGS. 2A-2C illustrate examples of different sensor (e.g., camera) configurations and corresponding 2D observations (e.g., images).

For example, in FIG. 2A, the vertical landmark 220A is in a field of view of camera 210A, which views the vertical landmark 220A while looking downward (e.g., at an angle below horizontal). With a downward looking camera configuration pointing between two vertical landmarks 240A (e.g., where the camera is mounted on a vehicle and pointing along the direction of travel), the two vertical landmarks 240A may appear pointing outward in the resulting image 230A. With this camera configuration, the image 230A captured by the camera 210A may have a vertical vanishing point below the image. In FIG. 2B, the camera 210B views the vertical landmark 220B horizontally. With a horizontal camera configuration pointing between two vertical landmarks 240B, the two vertical landmarks 240B may appear substantially vertically in the resulting image 230C. With this configuration, the image 230B captured by the camera 210B may have a vertical vanishing point at or near infinity. By contrast, in FIG. 2C, the camera 210C views the vertical landmark 220C while looking upward (e.g., at an angle above horizontal). With an upward looking camera configuration pointing between two vertical landmarks 240C, the two vertical landmarks 240C may appear pointing inward in the resulting image 230C. With this configuration, the image 230C captured by the camera 210C may have a vertical vanishing point above the image.

Generally, in embodiments which involve detection of directional landmarks, the rectification component 120 may apply a transformation to rectify a frame represented by the sensor data (e.g., each frame) to align directional landmarks reflected in the frame along a particular direction of the frame. Taking images of vertical landmarks as an example, the rectification component 120 may apply a transformation to rectify a particular image (e.g., each image) to align vertical landmarks in the image along the vertical direction of the image. In this example, each image may be rectified by applying a transformation to each image, based at least in part on the corresponding configuration data of the camera, so the vertical direction vanishing point is pushed to infinity. In some embodiments, the transformation to a frame may be based on a transformation that adjusts a corresponding sensor orientation associated with the frame (e.g., a camera matrix) to point in a horizontal direction, parallel with a ground plane, perpendicular to the direction of gravity, or some other reference direction. The resulting rectified frame may reflect transformed or translated vertical landmarks such that the vertical landmarks extend vertically with respect to the rectified frame (e.g., extend along column(s) of pixels of the rectified frame).

Figure 3:
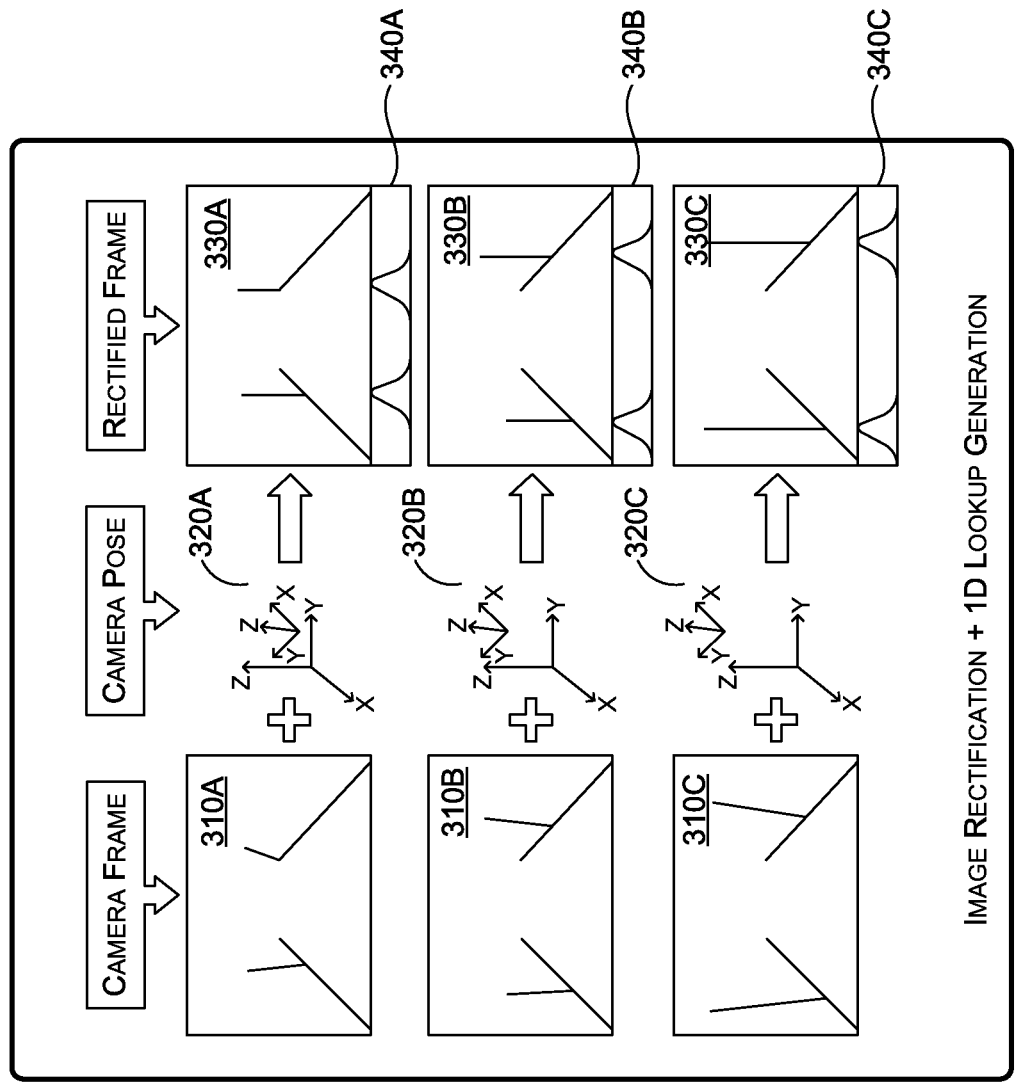
FIG. 3 is an illustration of an example of image rectification and lookup generation, in accordance with some embodiments of the present disclosure.

FIG. 3 illustrates an example of image rectification, in accordance with some embodiments of the present disclosure. In FIG. 3, camera frames 310A, 310B, and 310C reflect a series of images of vertical landmarks captured over time (e.g., where the camera is mounted on a vehicle and pointing along the direction of travel). In FIG. 3, each of the camera frames 310A, 310B, and 310C may correspond with camera poses 320A, 320B, and 320C, respectively. In this example, the rectification component 120 may apply a transformation to rectify the camera frames 310A, 310B, and 310C based on the camera poses 320A, 320B, and 320C to generate rectified frames 330A, 330B, and 330C, respectively, that align the vertical landmarks with the vertical direction of the rectified frames. As illustrated in FIG. 3, vertical landmarks appearing in the camera frames 310A, 310B, and 310C are pointed outward, while the same vertical landmarks appear substantially vertically in the rectified frames 330A, 330B, and 330C.

Additionally or alternatively, the rectification component may identify a transformation that aligns directional landmarks reflected in a frame of sensor data along a particular direction of the frame, and apply the transformation to a corresponding indication of detected directional landmarks in the frame (e.g., line, polyline, segmentation mask, etc.).

Returning back to FIG. 1, the landmark detector 102 may include an indicia consolidation component 130. The indicia consolidation component 130 may collapse indicia of directional landmarks into a 1D lookup that is a function of a single parameter. For example, the indicia consolidation component 130 may consolidate detected landmarks into a probability distribution that is a function of a single parameter (e.g., horizontal position in an image). In the embodiment illustrated in FIG. 1, the indicia consolidation component 130 includes a 1D lookup generator 134.

The object detector 132 may access a frame (e.g., an image), such as a rectified frame (e.g., a rectified image), and perform object detection to identify directional landmarks, such as vertical landmarks, represented in the frame. The object detector 132 may use any suitable detection technique. For example, object detection may be performed using computer vision, image processing, machine learning, edge or line detection, some combination thereof, or otherwise. In some embodiments, a neural network (e.g., a convolutional neural network (CNN)) may be trained to detect a particular type of landmark (e.g., a directional landmark such as a vertical landmark). For any given frame (e.g., each rectified frame), the object detector 132 may perform object detection to identify directional landmarks in the frame. The result may be an indication of a portion of the frame (e.g., a pixel, a region, a bounding box, etc.) that includes a detected landmark (e.g., a binary indication), a likelihood of a detected landmark (e.g., a probability), or otherwise. Taking images of vertical landmarks as an example, the object detector 132 may output a detected region of the image within which a vertical landmark has been detected, a probability that the detected region includes a detected vertical landmark, a probability for each pixel that the pixel is part of a vertical landmark, some combination thereof, or otherwise. For example, where a CNN is used, the result, or output, may be a segmentation mask including values (e.g., probability values) associated with pixels of an image(s) that may correspond to object types. In such an example, the CNN may be trained to output a binary segmentation mask identifying vertical landmarks (e.g., as a first class) and background (e.g., pixels not associated with vertical landmarks, as a second class), or may be trained to output a multi-class segmentation mask identifying different types of vertical landmarks (e.g., a tree class, a pole class, etc.), and background. These are merely examples, and any suitable object detection technique may be applied. Further, although some of the examples are described with respect to vertical landmarks, in some embodiment, any directional landmark, category of landmark, or other desired object may be detected.

The 1D lookup generator 134 may access indicia of a detected object in a frame of sensor data—such as an output from the object detector 132—and reduce the indicia to a probability distribution that is a function of a single parameter (a 1D probability distribution). The presence of a detected object in a frame may be represented by a 1D lookup that returns a corresponding value of the probability distribution. More specifically, the single parameter for the 1D lookup may correspond to a particular dimension of the frame, and the particular dimension may be perpendicular to the direction of aligned landmarks in a rectified frame. Taking detected vertical landmarks in rectified images as an example, a 1D lookup may reflect the probability that a vertical landmark is located at a particular horizontal position of a rectified image (e.g., a column of pixels). In embodiments in which frames of sensor data include two dimensions (e.g., images), by reducing each 2D frame to a 1D lookup, the 1D lookup may be stored and/or used for subsequent computations instead of the 2D frame. Thus, subsequent computations may no longer need to consider the full 2D frame (e.g., each pixel, or more specifically each row of pixels, of an image). Further, detected landmarks may be identified from the 1D lookup using a single parameter, rather than using a 2D lookup with two parameters (e.g., x and y values for a given pixel). As a result, much less data may need to be loaded, cached, or buffered as compared to conventional approaches that used 2D lookups, thus resulting in substantial processing and memory savings.

In some embodiments, for each rectified frame, a corresponding 1D lookup may be generated to represent the presence of a detected landmark (e.g., a detected vertical landmark) by a probability distribution that is a function of a single parameter. Generally, vertical landmarks in a rectified image may be represented as a single parameter family of lines (e.g., parameterized on $\theta$) since all lines representing a vertical landmark pass through the vanishing point of the vertical direction. FIGS. 2A-2C illustrate different parameterizations for $\theta$ based on different vertical vanishing point locations. For example, in FIGS. 2A and 2C, the lines that pass through the vertical landmarks 240A and 240C pass through the corresponding vanishing points in the images 230A and 230C, respectively. In these examples, $\theta$ represents an angular position with respect to a vanishing point in the image. In FIG. 2B, where the vertical vanishing point is at infinity, the parameter $\theta$ represents the horizontal position of the image 230B. In some embodiments, the parameterized representation may be normalized. In the example parameterization of FIG. 2B, the range of positions on a frame may be normalized (e.g., on [0, 1]). Additionally or alternatively, a 1D probability distribution may be discretized in a 1D histogram to facilitate sampling. Thus, in embodiments where frames include directional landmarks with corresponding vanishing points substantially at infinity (e.g., rectified frames), the directional landmarks may be parameterized on $\theta$ to represent their positions in a direction in the frame perpendicular to the directional landmarks.

The 1D lookup generator 134 may generate a 1D probability distribution using any suitable technique. For example, a 1D probability distribution may be generated using kernel density estimation by placing a kernel with a designated variance at locations of detected vertical landmarks and summing the kernels. FIG. 3 illustrates three example 1D lookups 340A, 340B, and 340C, in accordance with some embodiments of the present disclosure. In FIG. 3, rectified frames 330A, 330B, and 330C include vertical landmarks that have been aligned with the vertical direction of the rectified frames. In this example, 1D lookups 340A, 340B, and 340C have been parameterized based on the horizontal position of the rectified frames 330A, 330B, and 330C, respectively, and an example kernel has been placed in the 1D lookups 340A, 340B, and 340C at the locations of detected vertical landmarks in the rectified frames 330A, 330B, and 330C. These parameterized representations may be invariant to the row of the image. Thus, locations of vertical landmarks may be identified from an image or other frame of sensor data by performing a 1D lookup in a manner that is invariant to the row at which the lookup is performed.

Reducing some or all frames (e.g., images) represented by the sensor data to a corresponding 1D lookup may result in substantial processing and memory savings. For example, in some embodiments, the 1D lookup generator 134 may store a designated number of 1D lookups in a rolling buffer. By way of nonlimiting example, by storing the most recent ten or fifty (or some other number of) 1D lookups instead of the most recent ten or fifty images, much less data may need to be stored. Similarly, when identifying the locations of landmarks from the 1D lookups, much less data may need to be loaded and/or cached. Accordingly, transforming a frame of sensor data so landmarks all appear in one dimension (e.g., a cross section) may facilitate substantial processing and memory savings.

Returning now to FIG. 1, the grid sampler 140 of the landmark detector 102 may reconstruct directional landmarks based on a set of frames of sensor data and/or corresponding 1D lookups. More specifically, the grid sampler 140 may use a set of 1D lookups corresponding to a set of frames (e.g., the most recent N frames) to perform a 3D reconstruction of directional landmarks appearing in the frames. Generally, frames of sensor data may reflect 2D observations of 3D directional landmarks. Locations of the 3D directional landmarks and/or a probability distribution of the locations may be identified in a 3D coordinate system (e.g., a 3D world space). For example, a world coordinate system may be defined with respect to absolute coordinates (e.g., latitude, longitude, and elevation), relative coordinates (e.g., defined with respect to the location of the landmark detector 102), some combination thereof, or otherwise. As explained above, frames of sensor data may be associated with corresponding configuration data and/or a corresponding perspective projection matrix for the sensor(s) 112 used to generate the frame (e.g., stored in association in a rolling buffer). Thus, the grid sampler 140 may perform a 3D reconstruction by sampling a grid of points in the 3D coordinate system, transforming the 3D points into a corresponding position in a frame (e.g., its 2D position on an image), and accessing a probability from a corresponding 1D lookup to identify the probability that a landmark passes through a given 3D point.

In some embodiments, reconstruction of 3D directional landmarks such as vertical landmarks may be performed without computing a full 3D probability distribution. More specifically, an assumption may be made that a directional landmark may be represented by its cross-section with a 2D plane. For example, in embodiments that identify vertical landmarks, the 2D position of the vertical landmark on the ground plane may be taken as representative of the 3D position (e.g., because the vertical landmark extends along a known, vertical direction, so the vertical direction may be factored out). As such, in some embodiments, the grid sampler 140 may sample a grid of points from a plane (e.g., the ground plane) in the 3D coordinate system and compute a probability that a landmark passes through each point. As such, a 3D reconstruction may be restricted to a 2D reconstruction, obviating the need to sample one of the dimensions of a 3D grid, thereby reducing a number of corresponding computations required as compared to using a 3D grid—such as in conventional volumetric reconstruction.

Figure 4:
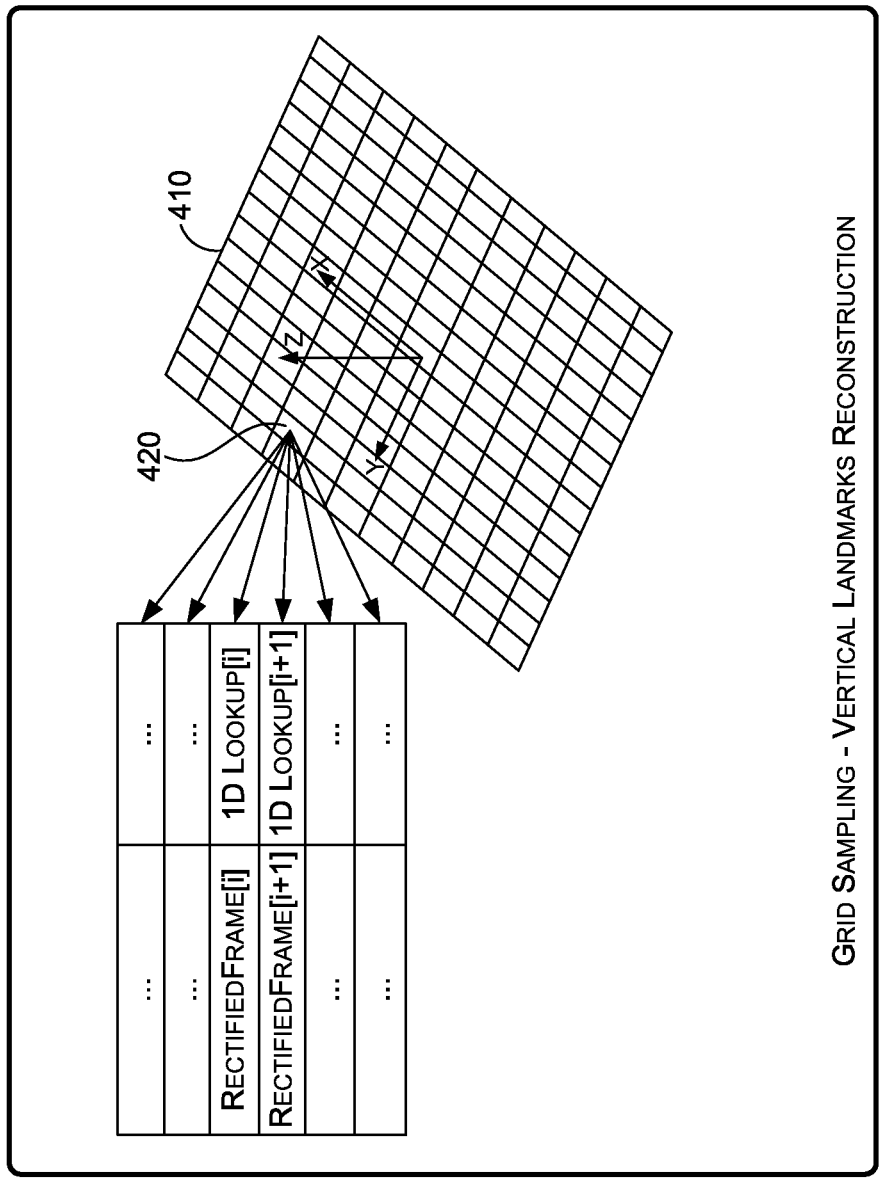
FIG. 4 is an illustration of an example of grid sampling for vertical landmark reconstruction, in accordance with some embodiments of the present disclosure.

For each sampled point on the grid (e.g., each cell on the ground plane), the grid sampler 140 may determine a probability of a directional landmark passing through the point using 1D lookups and corresponding configuration data and/or perspective projection matrices. FIG. 4 is an illustration of an example of grid sampling for vertical landmark reconstruction, in accordance with some embodiments of the present disclosure. In FIG. 4, the grid 410 may coincide with the ground plane of a 3D coordinate system. For each of the cells in the grid 410, the grid sampler 140 may determine a probability that a vertical landmark passes through the cell. For example, for a given cell in the grid 410, the position of the cell in 3D space may be back-projected into each 1D lookup to identify a probability—for each of a designated number of 1D lookups (e.g., the N most recent 1D lookups)—that a vertical landmark is located at the position of the cell. In some embodiments, the 1D lookups may represent the locations of detected landmarks as a probability. Accordingly, a projection into a 1D lookup may involve looking up and using a probability from the 1D lookup. In embodiments where object detection results in a detected region (e.g., line, box, etc.), if a projection lands on the detected region within a designated tolerance, a corresponding probability associated with the detected region may be assigned. These and other techniques for determining probability may be implemented.

Continuing with the example above, the probability that a vertical landmark is located at the position of the cell may be assigned the joint probability of the different probabilities, one for each 1D lookup, that a vertical landmark is located at that position. Taking the cell 420 as an example, for each of a set of N rectified frames, a corresponding 1D lookup may be used to determine a probability that a vertical landmark passes through the cell 420, resulting in a set of N probabilities, one for each 1D lookup. The probability that a vertical landmark passes through the cell 420 may be assigned the joint probability of the N probabilities. In some embodiments, the joint probability may be modified to account for false negative detection by adding a bias y to individual probabilities, forcing them to be strictly positive. The result of grid sampling may be a 2D probability distribution reflecting the likelihood that a vertical landmark is located at each point on a 2D grid (e.g., along the ground plane).

In some embodiments, the probability computation for each point in the grid may be parallelizable across a plurality of processors such as graphical processing units (GPUs). For example, because the probability computation for each point may be independent of the probability computations for the other points, probability computations for each point (or a group of points) may be assigned to different GPUs or to different threads of a same GPU to implement a per-grid-sample threading scheme. As such, a grid may be generated on a GPU, with the probability for each sample being resolved in parallel. For example, for a grid of size 1000× 100, 10^5 problems may be formulated and resolved concurrently. Generally, the probability computation described herein may suit GPU acceleration due to its low memory bandwidth requirements. More specifically, in some embodiments, for each frame of sensor data, only a single 1D lookup and a corresponding transformation matrix (e.g., camera projection matrix) may need to be uploaded. As such, these elements may be uploaded into a rolling buffer that maintains the most recent N pairs of {1D Lookup, Transformation}. In some examples, data storage may be reduced to N×(lookup_resolution+camera_pose) elements. This embodiment is for example purposes only, and other suitable variations may be implemented within the scope of the present disclosure.

Figure 5:
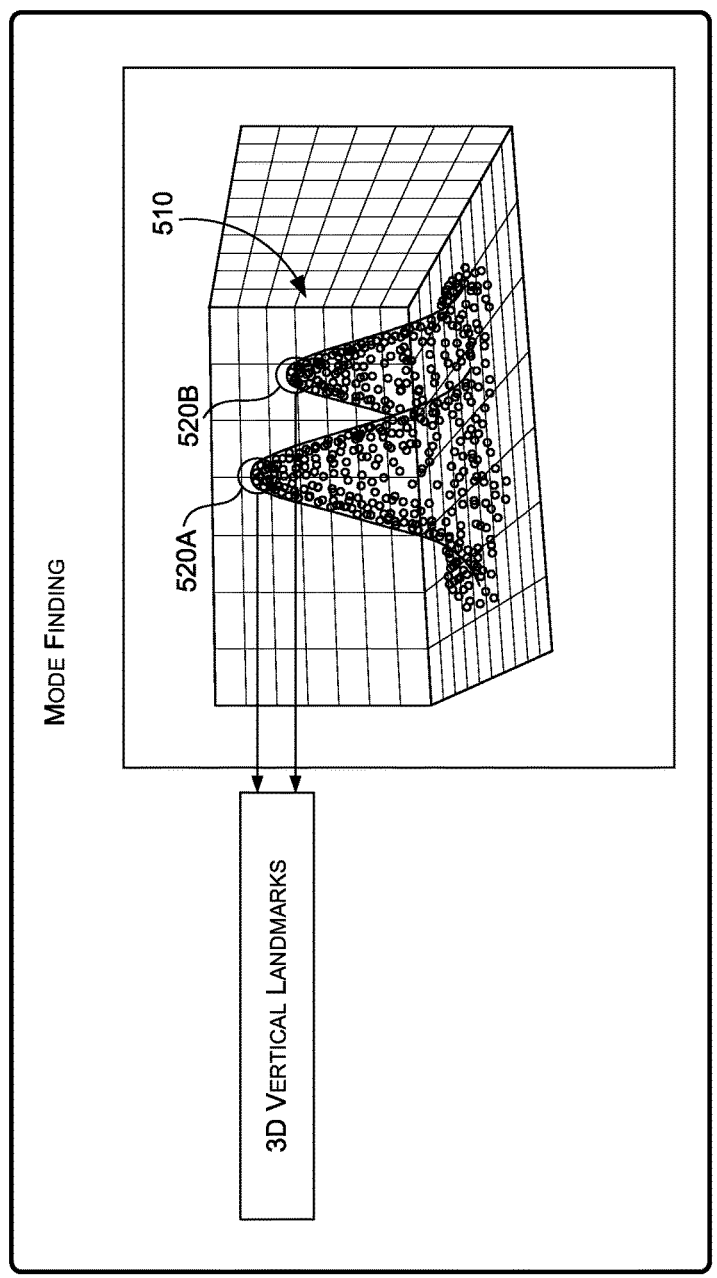
FIG. 5 is an illustration of an example of mode finding for vertical landmark reconstruction, in accordance with some embodiments of the present disclosure.

The mode identification component 150 (FIG. 1) of the landmark detector 102 may access a grid of probabilities forming a probability distribution indicating locations of directional landmarks (e.g., a 2D probability distribution) and may resolve the locations by finding the modes of the distribution. FIG. 5 is an illustration of an example of mode finding for vertical landmark reconstruction, in accordance with some embodiments of the present disclosure. In FIG. 5, a 2D probability distribution 510 is depicted with modes 520A and 520B. Any conventional technique may be used to identify the modes 520A and 520B, such as clustering, mode finding, optimization, and/or the like. In some examples, an iterative mode-climbing algorithm—such as mean-shift—may be applied to identify the modes 520A and 520B. Generally, any suitable mode finding technique may be implemented.

Figure 6:
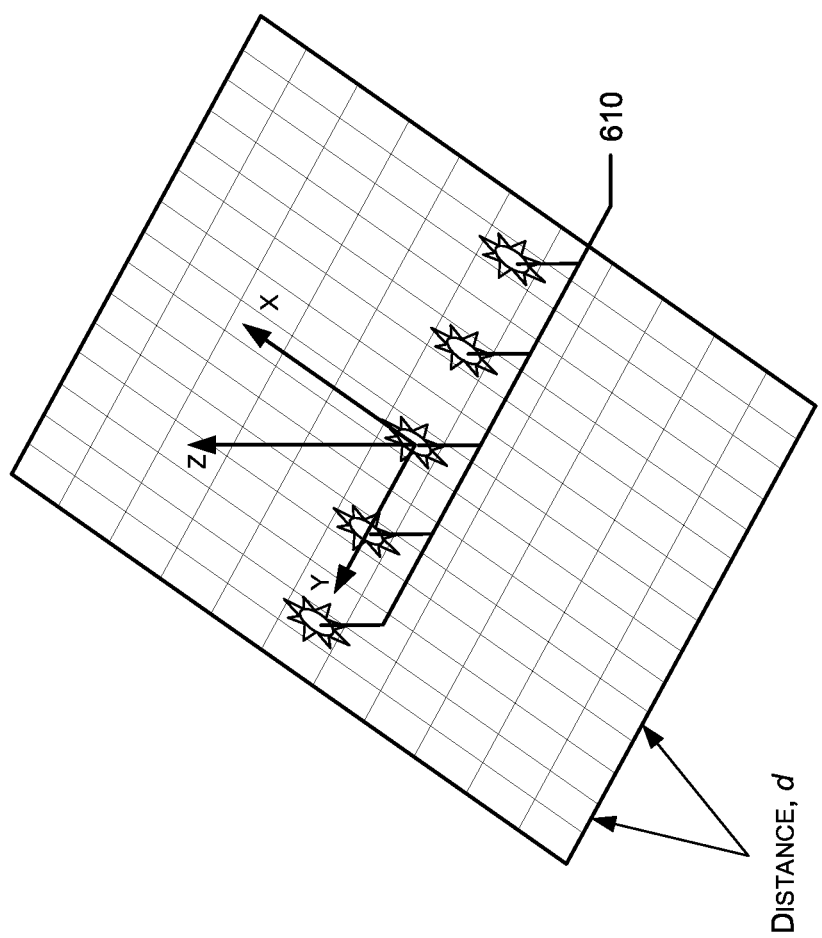
FIG. 6 is an illustration of an example of seeding along a line orthogonal to displacement of a landmark detector, in accordance with some embodiments of the present disclosure.

In examples, in order to ensure that all modes are climbed, the seed component 152 may initialize at least one seed in each basin of attraction in the probability distribution. In some embodiments, an assumption may be made that modes are separated by a minimum distance, d, (and using a kernel with infinite support) to facilitate identification of an upper bound on the number of seeds used, while ensuring that there is at least one seed within d of every point. Further, in the case of vertical landmark reconstruction, if the distance travelled (e.g., by a vehicle in which the landmark detector 102 is being executed) per frame of sensor data is less than d, seeding only along the line orthogonal to displacement (e.g., along the ground plane) should identify all modes. In practice, even if the distance is more than d, the probability distribution may be smooth and anisotropic (e.g., elongated in the direction of travel) enough that the seed may be likely to converge to the corresponding mode. As such, in some examples, the seed component 152 may initialize seeds for an iterative mode climbing algorithm at an interval, d, along a line orthogonal to displacement of the landmark detector 102. FIG. 6 is an illustration of an example of seeding along a line orthogonal to displacement of a landmark detector, in accordance with some embodiments of the present disclosure. In FIG. 6, the landmark detector travels in the x direction, and the seeds 610 are initialized at a distance d from one another along the y axis. This is simply one example of seeding, and other variations may be implemented.

In some embodiments, for each new frame (or set of frames) represented by the sensor data, a corresponding probability distribution (e.g., 2D grid) may be estimated, and seeds may be generated to climb to the modes. In some embodiments, mean-shift may further be applied to the modes from a previous frame (or set of frames). Consequently, multiple seeds may converge to the same mode, such that duplicates may be pruned. As such, de-duplication component 154 may implement a pruning scheme based on distance, for example, by discarding duplicates (e.g., within 1 meter or some other distance). In some examples, the mode identification component 150 may maintain or otherwise access a persistent set of modes (e.g., across time). In such examples, if a detected mode is not already present in the persistent set, the mode identification component 150 may add the detected mode to the set, and may trigger a signal to be emitted to serve as a notification that a new landmark was found at a particular location.

In some embodiments, the spatial extent component 160 (FIG. 1) may recover extents for reconstructed directional landmarks along the direction of the landmark (e.g., vertical heights for vertical landmarks). For example, a reconstructed directional landmark may be represented in the 3D coordinate system (e.g., world space) as a line that passes through an identified mode. The spatial extent component 160 may recover an extent by reprojecting the reconstructed directional landmark (e.g., the line) into the frame of reference (e.g., image space, a 2D plane, etc.) for a frame of sensor data (e.g., image) from which a directional landmark was detected. For example, for each frame, $F_i$, associated with a detected directional landmark (e.g., each of a set of N frames), the spatial extent component 160 may perform one or more of the following operations. The spatial extent component 160 may detect or otherwise identify starting points, $s_i$, and ending points, $e_i$, of detected directional landmarks appearing in the frame by comparison to the reprojected landmark. For each of the identified starting points, the spatial extent component 160 may reconstruct a 3D ray passing through the sensor(s) 112 (e.g., camera) and the starting point, identify the ray that comes closest to the reconstructed landmark, and identify the corresponding point, $s_{min}$, on the reconstructed landmark that comes closest to the ray. For each of the identified ending points, the spatial extent component 160 may reconstruct a 3D ray passing through the sensor(s) 112 (e.g., camera(s)) and the ending point, identify the ray that comes closest to the reconstructed landmark, and identify the corresponding point, $e_{min}$, on the reconstructed landmark that comes closest to the ray. By repeating this process for each $F_i$, the spatial extent component 160 may generate a set of potential starting points $\{s_1^{min}, s_2^{min}, \ldots, s_N^{min}\}$ and a set of potential ending points $\{e_1^{min}, e_2^{min}, \ldots, e_N^{min}\}$. The spatial extent component 160 may identify a representative start point and end point from the respective sets, for example, using k-mean clustering, some other clustering technique, or otherwise.

In some embodiments, the map integration component 170 may embed or otherwise integrate detected locations and/or extents of directional landmarks in a map. For example, in embodiments that detect locations of vertical landmarks, the locations may be embedded in a map (e.g., an HD map), provided to a map provider for such embedding, uploaded to a repository of landmark locations, and/or the like. As such, the vertical landmarks may aid an autonomous vehicle in navigating a physical environment, and specifically may aid the autonomous vehicle in performing localization for more accurate and safe navigation.

Figure 7:
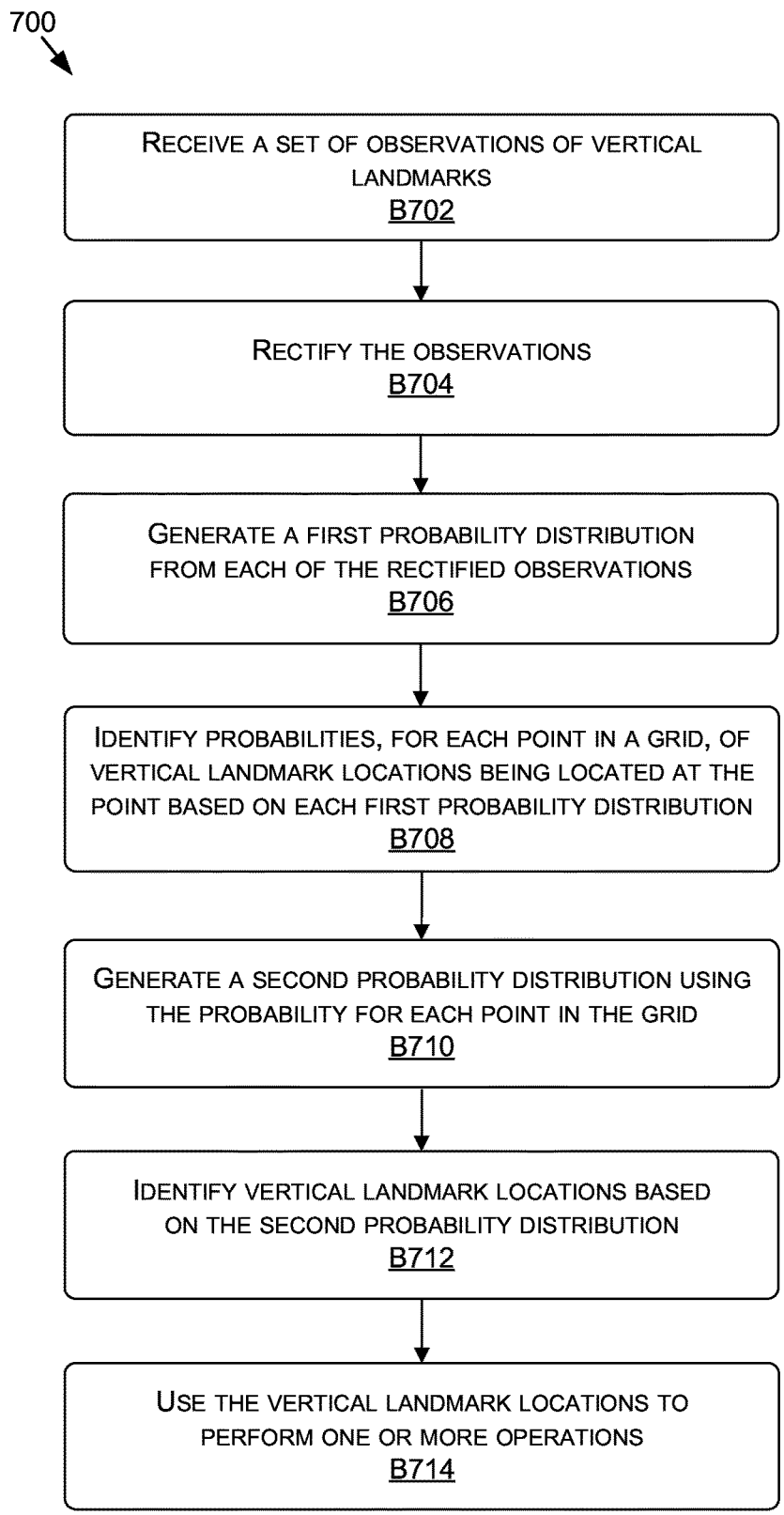
FIG. 7 is a flow diagram showing a method for vertical landmark reconstruction, in accordance with some embodiments of the present disclosure.

Now referring to FIG. 7, each block of method 700, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 700 is described, by way of example, with respect to the landmark detector 102 of FIG. 1. However, the method may additionally or alternatively be executed by any one system, or any combination of systems, including, but not limited to those described herein.

FIG. 7 is a flow diagram showing a method 700 for vertical landmark reconstruction, in accordance with some embodiments of the present disclosure. The method 700, at block B702, includes receiving a set of observations of vertical landmarks. For example, the indicia capture component 110 may generate a set of images and corresponding camera configuration information, and the indicia capture component 110 may provide the images and corresponding configuration information to the rectification component 120. In some embodiments, the object detector 132 may perform object detection on the images to generate an indication of directional landmarks (e.g., a parametrization, such as a line, polyline, segmentation mask, etc.), and the indication of directional landmarks (e.g., a segmentation mask) and corresponding configuration information may be provided to the rectification component 120. These are meant as examples, and other examples may be implemented within the scope of the present disclosure.

The method 700, at block B704, includes rectifying the observations. For example, the rectification component 120 may apply a transformation to the images based at least in part on the camera configuration information to generate a set of rectified observations. The transformation may align at least one vertical landmark along a vertical direction of the transformed images. Additionally or alternatively, the transformation can be applied to an indication of detected directional landmarks (e.g., line, polyline, segmentation mask, etc.) to generate a set of rectified observations.

The method 700, at block B706, includes generating a first probability distribution from each of the rectified observations. For example, the indicia consolidation component 130 may generate, for each transformed observation, a first probability distribution representative of probabilities of the at least one vertical landmark being located in columns of the transformed observation. Each first probability distribution may be a function of a single parameter.

The method 700, at block B708, includes computing probabilities, for each point in a grid, of vertical landmark locations being located at the point based on each first probability distribution. For example, the grid sampler 140 may identify, for each point sampled from a ground plane, a probability a vertical landmark is located at the point. The probability for each point may be based at least in part on the first probability distribution for each of the transformed observations.

The method 700, at block B710, includes generating a second probability distribution using the probability for each point in the grid. For example, the grid sampler 140 may generate the second probability distribution using the probability for each point sampled from the ground plane. The second probability distribution may comprise, for each point, the joint probability of a set of probabilities, one for each of the transformed observations, that a vertical landmark is located at the point.

The method 700, at block B712, includes identifying vertical landmark locations based on the second probability distribution. For example, the mode identification component 150 may identify locations of the vertical landmarks by finding the modes of the second probability distribution.

The method 700, at block B714, includes using the vertical landmark locations to perform one or more operations. For example, the map integration component 170 may embed or otherwise integrate the vertical landmark locations in a map. As such, the vertical landmarks may aid an autonomous vehicle in navigating a physical environment, and specifically may aid the autonomous vehicle in performing localization for more accurate and safe navigation.

Figure 8:
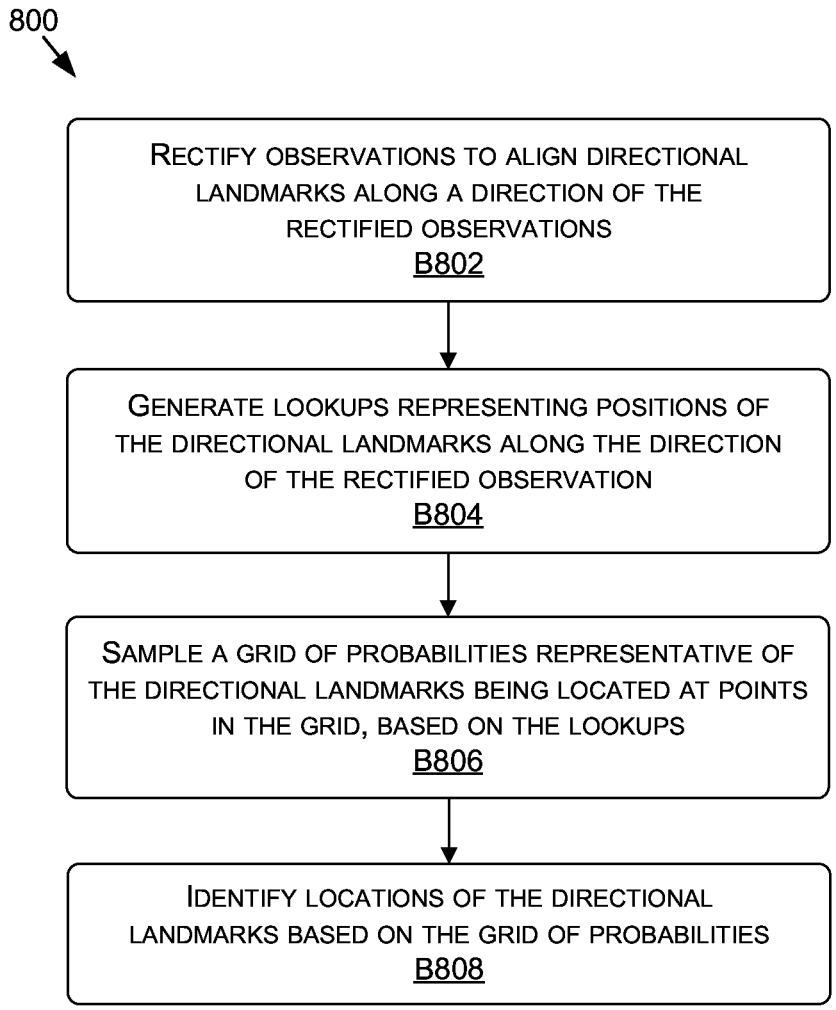
FIG. 8 is a flow diagram showing a method for directional landmark reconstruction, in accordance with some embodiments of the present disclosure.

Now referring to FIG. 8, each block of method 800, described herein, comprises a computing process that may be performed using any combination of hardware, firmware, and/or software. For instance, various functions may be carried out by a processor executing instructions stored in memory. The method may also be embodied as computer-usable instructions stored on computer storage media. The methods may be provided by a standalone application, a service or hosted service (standalone or in combination with another hosted service), or a plug-in to another product, to name a few. In addition, method 800 is described, by way of example, with respect to the landmark detector 102 of FIG. 1. However, the method may additionally or alternatively be executed by any one system, or any combination of systems, including, but not limited to, those described herein.

FIG. 8 is a flow diagram showing a method 800 for directional landmark reconstruction, in accordance with some embodiments of the present disclosure. The method 800, at block B802, includes rectifying observations to align directional landmarks along a direction of the rectified observations. For example, the observations may be images of a 3D space, 2D or 3D LiDAR data, segmentation masks (whether in a 2D layout, a sparse representation, or otherwise), or some other representation, and the rectification component 120 may rectify the observations by transforming each of the observations to generate a rectified observation aligning one or more directional landmarks along a direction of the rectified observation.

The method 800, at block B804, includes generating lookups representing positions of the directional landmarks along the direction of the rectified observation. For example, the indicia consolidation component 130 may generate, for each rectified observation in the set of rectified observations, a lookup representing a position of the one or more directional landmarks along the direction of the rectified observation. In some embodiments, each lookup may be a probability distribution that is a function of a single parameter.

The method 800, at block B806, includes sampling a grid of probabilities representative of directional landmarks being located at points in the grid, based on the lookups. For example, the grid sampler 140 may generate a probability distribution by, for each point in a grid sampled from 3D space, computing a probability that one of the one or more directional landmarks is located at the point based at least in part on the lookup for each of the rectified observations.

The method 800, at block B808, includes identifying locations of the directional landmarks based on the grid of probabilities. For example, the mode identification component 150 may identify locations of the one or more directional landmarks in the 3D space by finding the modes in the probability distribution.

Figure 9:
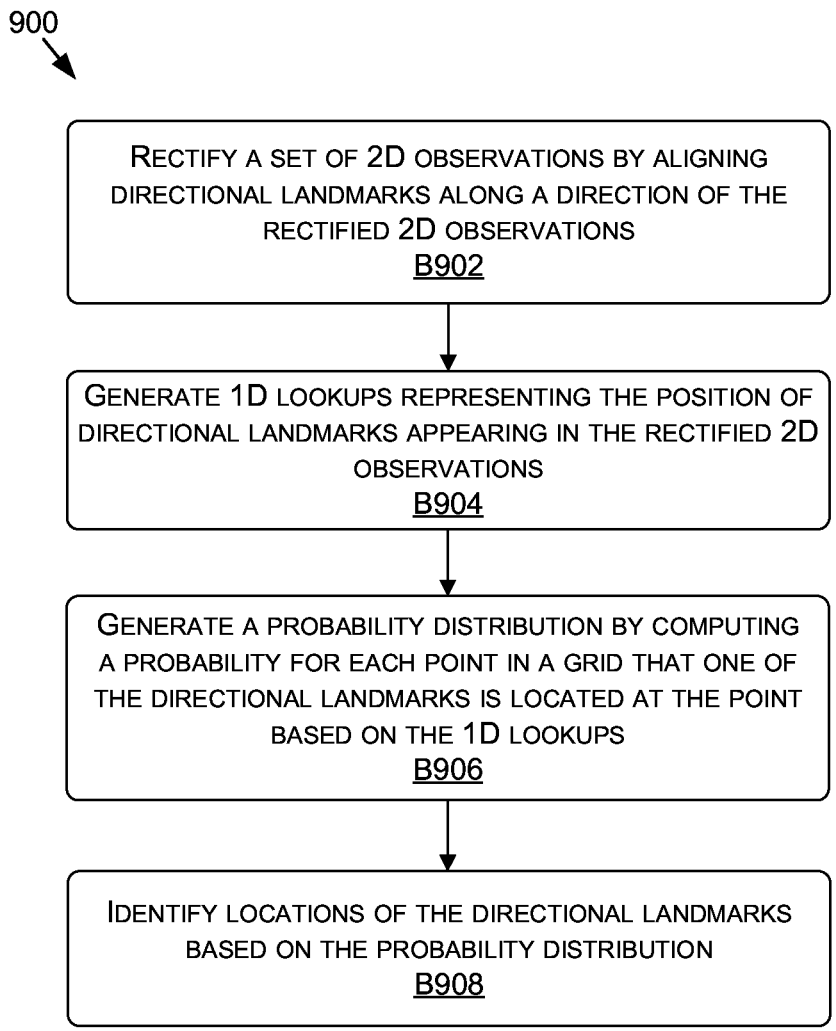
FIG. 9 is a flow diagram showing another method for directional landmark reconstruction, in accordance with some embodiments of the present disclosure.

Now referring to FIG. 9, each block of method 900, described herein, comprises a computing process that may be performed using any combination of hardware, firmware, and/or software. For instance, various functions may be carried out by a processor executing instructions stored in memory. The method may also be embodied as computer-usable instructions stored on computer storage media. The method may be provided by a standalone application, a service or hosted service (standalone or in combination with another hosted service), or a plug-in to another product, to name a few. In addition, method 900 is described, by way of example, with respect to the landmark detector 102 of FIG. 1. However, the method may additionally or alternatively be executed by any one system, or any combination of systems, including, but not limited to, those described herein.

FIG. 9 is a flow diagram showing a method 900 for directional landmark reconstruction, in accordance with some embodiments of the present disclosure. The method 900, at block B902, includes rectifying a set of 2D observations by aligning directional landmarks along a direction of the rectified 2D observations. For example, the rectification component 120 may rectify a set of two-dimensional observations by transforming each of the 2D observations to generate a rectified 2D observation aligning one or more directional landmarks along a direction of the rectified 2D observation.

The method 900, at block B904, includes generating 1D lookups representing position of the directional landmarks appearing in the rectified 2D observations. For example, the indicia consolidation component 130 may, for each rectified 2D observation in the set of 2D observations, generate a one-dimensional (1D) lookup representing the one or more directional landmarks appearing in the rectified 2D observation as a 1D probability distribution.

The method 900, at block B906, includes generating a probability distribution by computing a probability for each point in a grid that one of the directional landmarks is located at the point based on the 1D lookups. For example, the grid sampler 140 may generate a probability distribution by, for each point in the grid, computing a probability that one of the one or more directional landmarks is located at the point based on the 1D lookups associated with the set of 2D observations.

The method 900, at block B908, includes identifying locations of the directional landmarks based on the probability distribution. For example, the mode identification component 150 may identify locations of the one or more directional landmarks by finding the modes in the probability distribution.

Although embodiments described herein involve detection of vertical landmarks, in some embodiments, any directional landmark may be detected (e.g., horizontal landmarks, landmarks appearing at some angle such as 45°, etc.). Moreover, although embodiments described herein involve generation of a 2D grid representing locations of vertical landmarks as a 2D probability distribution, in some embodiments, any suitable geometry for a distribution may be sampled (e.g., a 3D grid, some irregular 2D or 3D shape, etc.). Furthermore, although embodiments described herein involve generation and use of a 1D lookup, this need not be the case. More generally, some embodiments may perform dimensionality reduction on a multi-dimensional frame of sensor data to generate a lookup that collapses one or more of dimensions of indicia. These and other variations are contemplated within the present disclosure.

Example Vehicle

Figure 10:
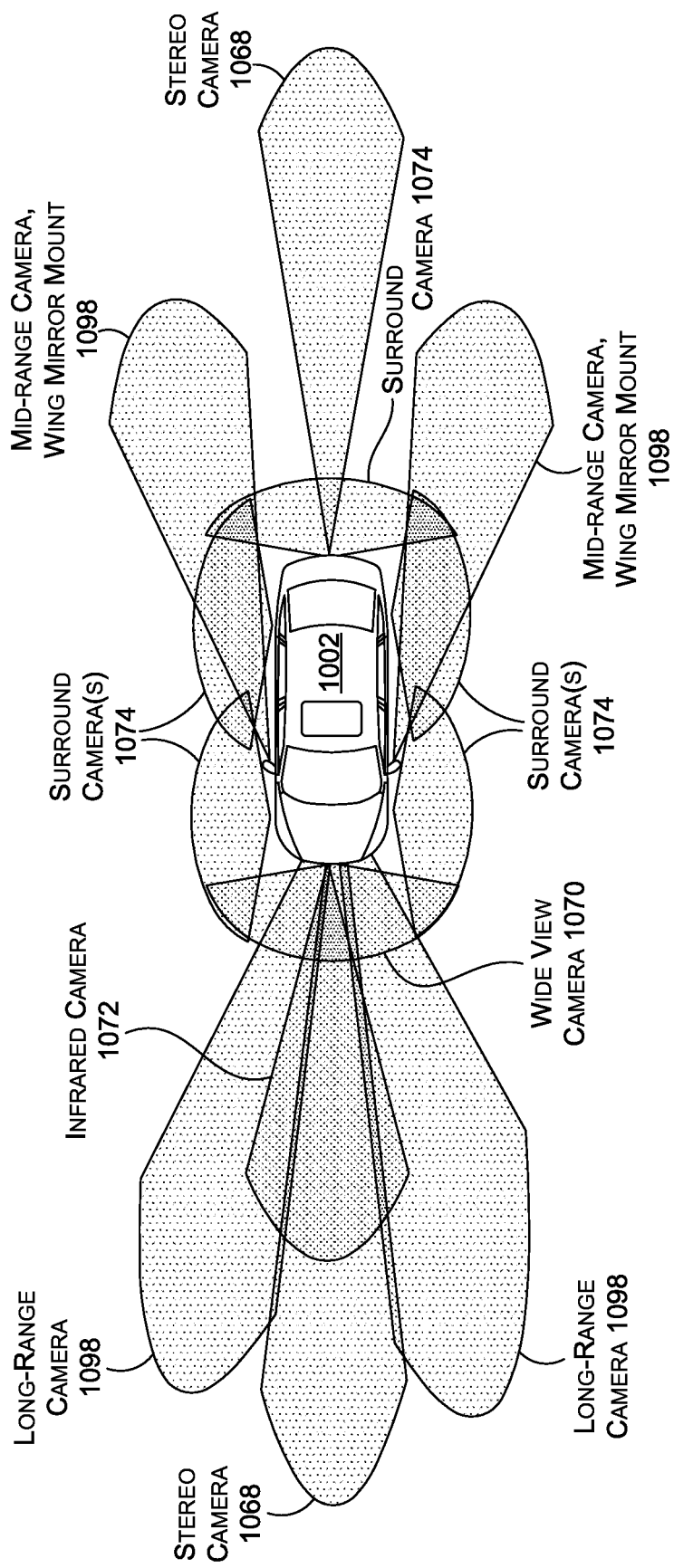
FIG. 10 is an example of possible camera locations on a vehicle and corresponding fields of view, in accordance with some embodiments of the present disclosure.

In some embodiments, the landmark detector 102 of FIG. 1 may be mounted to a moving vehicle and used to capture images of a field(s) of view of the sensor(s), including vertical landmarks, as the vehicle travels. FIG. 10 is an example of possible camera locations on a vehicle 1002 and corresponding fields of view, in accordance with some embodiments of the present disclosure, in accordance with some embodiments of the present disclosure. The cameras and respective fields of view are simply examples and are not intended to be limiting. For example, one or more of the cameras may be utilized, additional and/or alternative cameras may be included, and/or the cameras may be located at different locations on the vehicle 1002. Generally, the vehicle 1002 may include a passenger vehicle, such as a car, a truck, a bus, and/or another type of vehicle that accommodates one or more passengers. In some embodiments, the vehicle may be an airborne vehicle (e.g., plane, helicopter, etc.), a nautical vehicle (e.g., boat, submarine, etc.), a space or delivery vehicle (e.g., a rocket, satellite, etc.), an autonomous vehicle, a semi-autonomous vehicle, a non-autonomous vehicle, indoor/outdoor robots of various sizes, or otherwise.

Generally, the landmark detector 102 and/or vehicle 1002 may include any number of camera types, including stereo camera(s) 1068, wide-view camera(s) 1070, infrared camera(s) 1072, surround camera(s) 1074, long-range and/or mid-range camera(s) 1098, and/or other camera types. The cameras may be used to capture image data around an entire periphery of the vehicle 1002. The types of cameras used depends on the embodiments and requirements for the vehicle 1002, and any combination of camera types may be used to provide the necessary coverage around the vehicle 1002. In addition, the number of cameras may differ depending on the embodiment. For example, the vehicle may include six cameras, seven cameras, ten cameras, twelve cameras, and/or another number of cameras. The cameras may support, as an example and without limitation, Low Voltage Differential Signaling (LVDS) and/or Gigabit Ethernet.

The camera types for the cameras may include, but are not limited to, digital cameras that may be adapted for use with the components and/or systems of the vehicle 1002. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity. Any suitable lens may be used, including lenses with a narrow field of view lens, wide field of view, fish-eye lens, and others.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1002 (e.g., front-facing cameras) may be used for surround view, to help identify forward facing paths and obstacles, as well aid in, with the help of one or more controllers and/or control SoCs, providing information critical to generating an occupancy grid and/or determining the preferred vehicle paths. Front-facing cameras may be used to perform many of the same ADAS functions as LIDAR, including emergency braking, pedestrian detection, and obstacle avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1070 that may be used to perceive objects coming into view from the periphery (e.g., pedestrians, crossing traffic or bicycles). Although only one wide-view camera is illustrated in FIG. 11B, there may any number of wide-view cameras 1070 on the vehicle 1002. In addition, long-range camera(s) 1098 (e.g., a long-view stereo camera pair) may be used for depth-based object detection, especially for objects for which a neural network has not yet been trained. The long-range camera(s) 1098 may also be used for object detection and classification, as well as basic object tracking.

One or more stereo cameras 1068 may also be included in a front-facing configuration. The stereo camera(s) 1068 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1068 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1068 may be used in addition to, or alternatively from, those described herein.

Cameras with a field of view that include portions of the environment to the side of the vehicle 1002 (e.g., side-view cameras) may be used for surround view, providing information used to create and update the occupancy grid, as well as to generate side impact collision warnings. For example, surround camera(s) 1074 may be positioned to on the vehicle 1002. The surround camera(s) 1074 may include wide-view camera(s) 1070, fisheye camera(s), 360 degree camera(s), and/or the like. Four example, four fisheye cameras may be positioned on the vehicle's front, rear, and sides. In an alternative arrangement, the vehicle may use three surround camera(s) 1074 (e.g., left, right, and rear), and may leverage one or more other camera(s) (e.g., a forward-facing camera) as a fourth surround view camera.

Cameras with a field of view that include portions of the environment to the rear of the vehicle 1002 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1098, stereo camera(s) 1068), infrared camera(s) 1072, etc.), as described herein.

Figure 11:
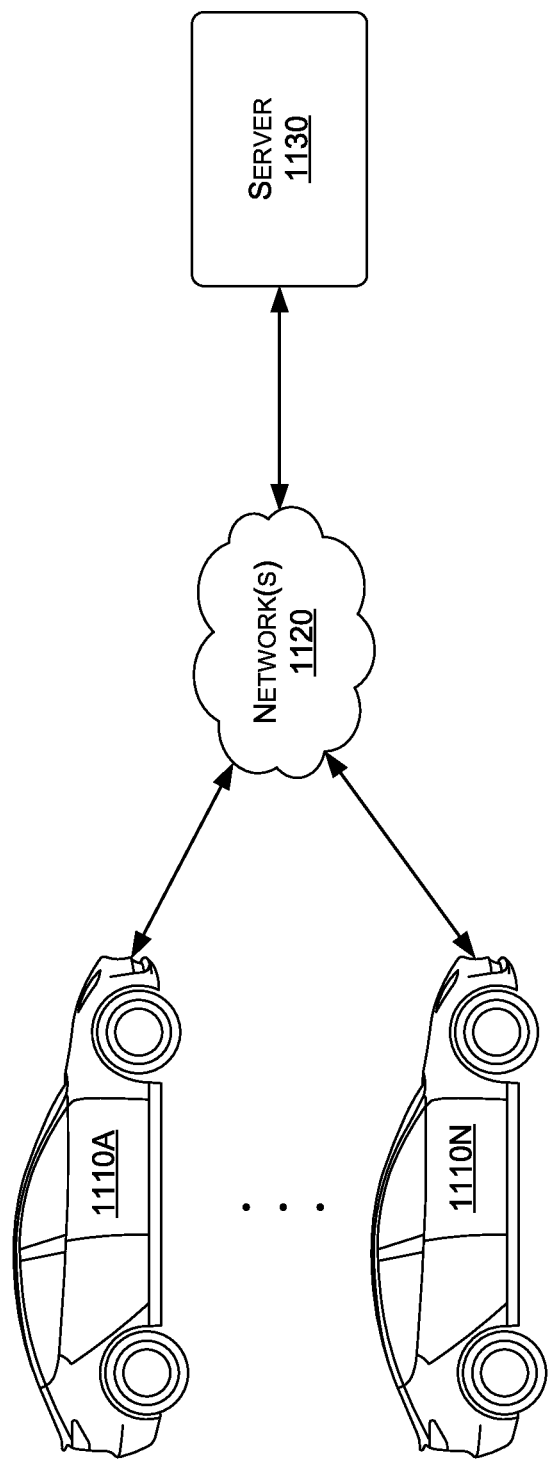
FIG. 11 is a system diagram for communication of detected landmarks amount one or more vehicle(s) and cloud-based server(s), in accordance with some embodiments of the present disclosure.

FIG. 11 is a system diagram for communication between cloud-based server(s) and the example vehicles 1110A through 1110N, in accordance with some embodiments of the present disclosure. A vehicle communication system, such as the vehicle communication system illustrated in FIG. 11 may include server(s) 1130, network(s) 1120, and any number of vehicles 1110A through 1110N (which may correspond with the vehicle 1002 of FIG. 10).

Any or all of the vehicles 1110A through 1110N may include one or more network interfaces which may include one or more wireless antennas (e.g., one or more wireless antennas for different communication protocols, such as a cellular antenna, a Bluetooth antenna, etc.). The network interface may be used to enable wireless connectivity over the Internet with the cloud (e.g., with the server(s) 1130 and/or other network devices), with other vehicles (e.g., one or more of the vehicles 1110A through 1110N), and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide one or more of the vehicles 1110A through 1110N with information about vehicles in proximity to the one or more vehicles 1110A through 1110N (e.g., vehicles in front of, on the side of, and/or behind the one or more vehicles 1110A through 1110N). This functionality may be part of a cooperative adaptive cruise control functionality.

The network interface may include a SoC that provides modulation and demodulation functionality and enables the controller(s) to communicate over wireless networks. The network interface may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The network interface may use one or more wireless antenna(s) and/or modem(s) to communicate over one or more networks. For example, the network interface may be capable of communication over LTE, WCDMA, UMTS, GSM, CDMA2000, etc. The wireless antenna(s) may also enable communication between objects in the environment (e.g., vehicles, mobile devices, etc.), using local area network(s), such as Bluetooth, Bluetooth LE, Z-Wave, ZigBee, etc., and/or low power wide-area network(s) (LPWANs), such as LoRaWAN, SigFox, etc.

Any or all of the vehicles 1110A through 1110N may further include one or more data store(s) which may include off-chip (e.g., off the SoC(s)) storage. The data store(s) may include one or more storage elements including RAM, SRAM, DRAM, VRAM, Flash, hard disks, and/or other components and/or devices that can store at least one bit of data.

Any or all of the vehicles 1110A through 1110N may further include one or more GNSS sensor(s). The GNSS sensor(s) (e.g., GPS and/or assisted GPS sensors) may assist in mapping, perception, occupancy grid generation, and/or path planning functions. Any number of GNSS sensor(s) may be used, including, for example and without limitation, a GPS using a USB connector with an Ethernet to Serial (RS-232) bridge.

The server(s) 1130 may include a plurality of GPUs, PCIe switches, and/or CPUs. The GPUs, the CPUs, and the PCIe switches may be interconnected with high-speed interconnects such as, for example and without limitation, NVLink interfaces developed by NVIDIA and/or PCIe connections. In some examples, the GPUs are connected via NVLink and/or NVSwitch SoC and the GPUs and the PCIe switches are connected via PCIe interconnects. Depending on the embodiment, each of a plurality of servers may include any number of GPUs, CPUs, and/or PCIe switches.

The server(s) 1130 may receive, over the network(s) 1120 and from any or all of the vehicles 1110A through 1110N, detected locations and/or extents of directional landmarks, a map with detected locations and/or extents of directional landmarks embedded or otherwise integrated therein, or other related information. The server(s) 1130 may transmit, over the network(s) 1120 and to any or all of the vehicles 1110A through 1110N, and/or over the network(s) 1120 and to one or more map providers, detected locations and/or extents of directional landmarks, a map with detected locations and/or extents of directional landmarks embedded or otherwise integrated therein, or other related information. Additionally or alternatively, any or all of the vehicles 1110A through 1110N may transmit, over the network(s) 1120 and to one or more map providers, detected locations and/or extents of directional landmarks, a map with detected locations and/or extents of directional landmarks embedded or otherwise integrated therein, or other related information. These and other variations are contemplated within the present disclosure.

Example Computing Device

Figure 12:
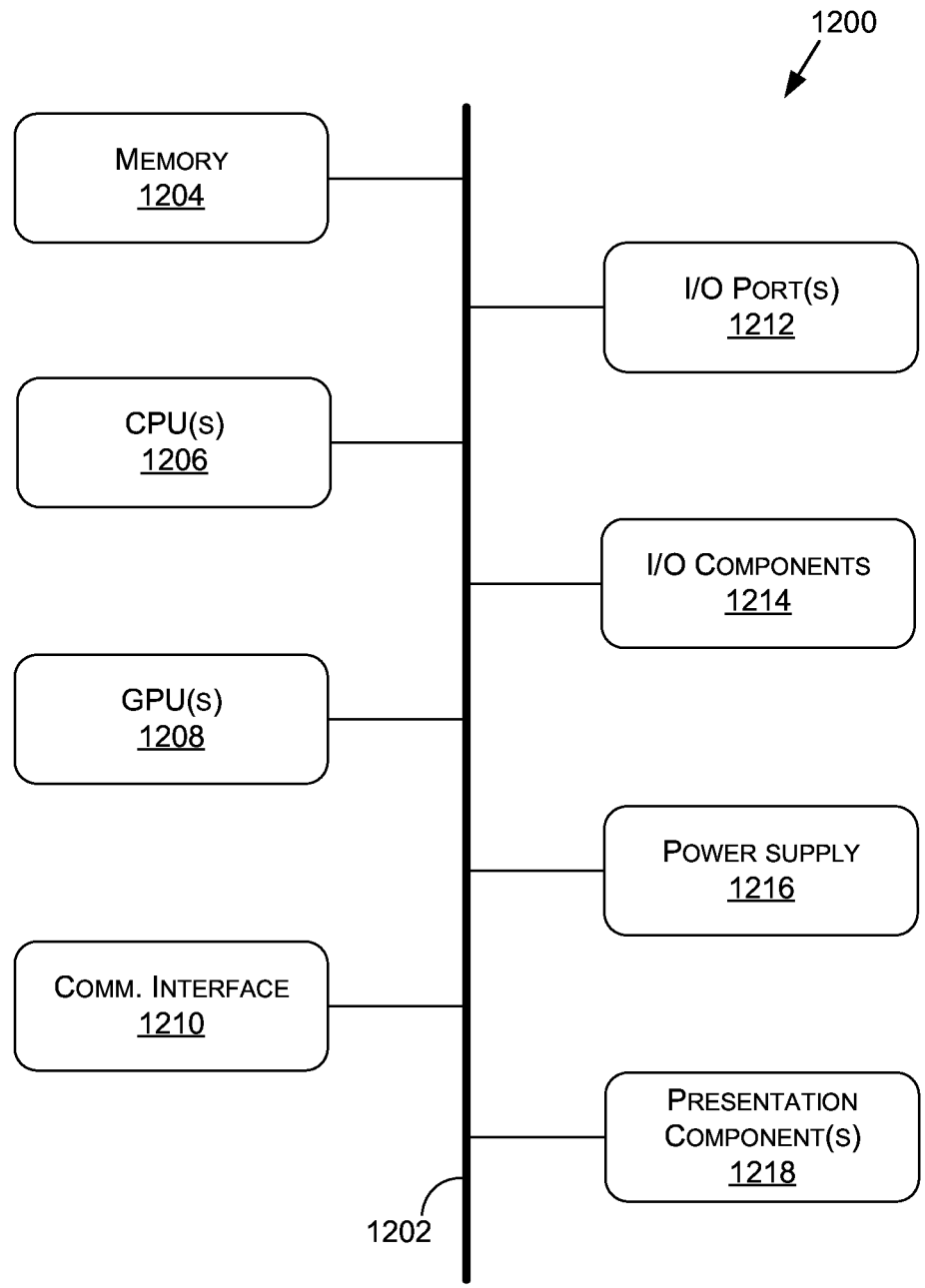
FIG. 12 is a block diagram of an example computing device suitable for use in implementing some embodiments of the present disclosure.

FIG. 12 is a block diagram of an example computing device 1200 suitable for use in implementing some embodiments of the present disclosure. Computing device 1200 may include a bus 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, and one or more presentation components 1218 (e.g., display(s)).

Although the various blocks of FIG. 12 are shown as connected via the bus 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The bus 1202 may represent one or more busses, such as an address bus, a data bus, a control bus, or a combination thereof. The bus 1202 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1204 may include any of a variety of computer-readable media. The computer-readable media may be any available media that can be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1200. As used herein, computer storage media does not comprise signals per se.

The communication media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the communication media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an ARM processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

The GPU(s) 1208 may be used by the computing device 1200 to render graphics (e.g., 3D graphics). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data. The display memory may be included as part of the memory 1204. The GPU(s) 1208 may include two or more GPUs operating in parallel (e.g., via a link). When combined together, each GPU 1208 can generate pixel data for different portions of an output image or for different output images (e.g., a first GPU for a first image and a second GPU for a second image). Each GPU can include its own memory, or can share memory with other GPUs.

In examples where the computing device 1200 does not include the GPU(s) 1208, the CPU(s) 1206 may be used to render graphics.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:

receiving camera configuration information for a camera and a set of images of a 3D space generated using the camera;

based at least in part on the camera configuration information, generating a set of rectified two-dimensional (2D) observations by applying a transformation to data derived from at least one image of the set of images, the transformation aligning at least one directional landmark along a direction of the rectified 2D observations;

for one or more rectified 2D observations of the set of rectified 2D observations, reducing each rectified 2D observation of the one or more rectified 2D observations to a one-dimensional (1D) lookup that represents presence of the at least one directional landmark in columns of pixels of the rectified 2D observation as a function of a single parameter;

identifying a probability of the at least one directional landmark being located at each point of one or more points sampled from two spatial dimensions of the 3D space, the identifying based at least in part on the 1D lookup for one or more of the rectified 2D observations;
generating a probability distribution using the probability for each of the one or more points; and
identifying at least one location of the at least one directional landmark in the two spatial dimensions based at least in part on the probability distribution.

2. The method of claim 1, further comprising uploading the 1D lookup for one or more of the rectified 2D observations to a rolling buffer that maintains corresponding probability distributions associated with a designated number of most recently captured images.

3. The method of claim 1, wherein the camera is associated with a vehicle, and the set of images is generated while the vehicle is moving.

4. The method of claim 1, wherein the reducing of each rectified 2D observation of the one or more rectified 2D observations to the 1D lookup comprises:
identifying the at least one directional landmark in a single dimension of the rectified 2D observation; and
generating the 1D lookup by placing a kernel at the at least one location of the at least one directional landmark in the single dimension and summing each kernel.

5. The method of claim 1, further comprising discretizing the 1D lookup for one or more of the rectified 2D observations into a one-dimensional histogram.

6. The method of claim 1, further comprising generating the probability distribution on a GPU by resolving in parallel the probability of the at least one directional landmark being located at each point of two or more of the points sampled from the two spatial dimensions of the 3D space.

7. The method of claim 1, wherein the identifying of the at least one location of the at least one directional landmark comprises identifying modes in the probability distribution by seeding at a designated interval along a line orthogonal to displacement of the camera.

8. A method comprising:
rectifying a set of two-dimensional (2D) observations of a 3D space to generate a set of rectified 2D observations by, for each of the 2D observations in the set of 2D observations, transforming the 2D observations to generate a rectified 2D observation, the rectifying causing alignment of one or more directional landmarks along a direction of the rectified 2D observation;
for one or more of the rectified 2D observations in the set of rectified 2D observations, reducing each rectified 2D observation of the one or more rectified 2D observations to a one-dimensional (1D) lookup representing presence of the one or more directional landmarks in columns of pixels of the rectified 2D observation as a function of a single parameter;
generating a probability distribution by computing a probability that one of the one or more directional landmarks is located at each point of one or more points sampled from two spatial dimensions of the 3D space, the computing based at least in part on the 1D lookup for one or more of the rectified 2D observations; and
identifying at least one location of the one or more directional landmarks in the two spatial dimensions based on the probability distribution.

9. The method of claim 8, further comprising uploading a set of 1D lookups associated with one or more 2D observations of the set of 2D observations to a rolling buffer that maintains corresponding 1D lookups associated with a designated number of most recently captured observations.

10. The method of claim 8, wherein the reducing of each rectified 2D observation of the one or more rectified 2D observations to the 1D lookup representing the presence of the one or more directional landmarks comprises:
detecting the one or more directional landmarks in a dimension orthogonal to the direction of the rectified 2D observation; and
generating the 1D lookup by placing a kernel at detected locations of the one or more directional landmarks in the dimension and summing each kernel.

11. The method of claim 8, further comprising discretizing the 1D lookup for one or more of the rectified 2D observations into a one-dimensional histogram.

12. The method of claim 8, wherein the computing, for each point of one or more of the points of the probability that one of the one or more directional landmarks is located at the point comprises:
back-projecting the point into each 1D lookup using corresponding sensor configuration information for the 1D lookup;
generating a set of probabilities by computing a probability that the point coincides with a directional landmark represented by the 1D lookup for each 1D lookup associated with the set of 2D observations; and
assigning the probability that one of the one or more directional landmarks is located at the point to be a joint probability of the set of probabilities.

13. The method of claim 8, further comprising generating the probability distribution on a GPU by resolving in parallel the probabilities that one of the one or more directional landmarks is located at each point of two or more of the points sampled from the two spatial dimensions of the 3D space.

14. The method of claim 8, wherein the identifying the at least one location of the one or more directional landmarks comprises identifying modes in the probability distribution by seeding at a designated interval along a line orthogonal to displacement of a sensor associated with the set of 2D observations.

15. A method comprising:
rectifying a set of two-dimensional (2D) observations of a 3D space into a set of rectified 2D observations by transforming each of the 2D observations to generate a rectified 2D observation aligning one or more directional landmarks along a direction of the rectified 2D observation;
for one or more rectified 2D observations in the set of rectified 2D observations, reducing each rectified 2D observation of the one or more rectified 2D observations to a one-dimensional (1D) lookup representing presence of the one or more directional landmarks appearing in columns of pixels of the rectified 2D observation as a function of a single parameter;
generating a probability distribution by computing a probability that one of the one or more directional landmarks is located at each point of one or more points sampled from two spatial dimensions of the 3D space, the computing based on the 1D lookup for one or more rectified 2D observations of the set of rectified 2D observations; and
identifying at least one location of the one or more directional landmarks in the two spatial dimensions based on the probability distribution.

16. The method of claim 15, further comprising maintaining, in a rolling buffer, a set of 1D lookups associated with a designated number of most recently captured 2D observations.

17. The method of claim 15, wherein the set of 2D observations is generated using one or more sensors mounted to a vehicle.

18. The method of claim 15, further comprising discretizing the 1D lookup into a 1D histogram.

19. The method of claim 15, further comprising generating the probability distribution on a GPU by resolving in parallel the probabilities that one of the one or more directional landmarks is located at each point of two or more of the points sampled from the two spatial dimensions of the 3D space.

20. The method of claim 15, wherein the identifying the at least one location of the one or more directional landmarks comprises identifying modes in the probability distribution by seeding at a designated interval along a line orthogonal to displacement of a sensor associated with the set of 2D observations.

* * * * *